(12) United States Patent
Waldron et al.

(10) Patent No.: US 6,634,801 B1
(45) Date of Patent: Oct. 21, 2003

(54) ADJUSTABLE STRAIN RELIEF BOOT

(75) Inventors: Mark R. Waldron, Poplar Grove, IL (US); Thom Simmons, Aurora, IL (US)

(73) Assignee: Stratos Lightwave, Inc., Chicago, IL (US)

( * ) Notice: Subject to any disclaimer, the term of this patent is extended or adjusted under 35 U.S.C. 154(b) by 360 days.

(21) Appl. No.: 09/712,442

(22) Filed: Nov. 14, 2000

(51) Int. Cl.[7] ................................. G02B 6/36
(52) U.S. Cl. .................. 385/86; 385/135; 385/137
(58) Field of Search .................. 385/86, 76, 100, 385/139, 87, 135, 137

(56) References Cited

U.S. PATENT DOCUMENTS

| | | | | |
|---|---|---|---|---|
| 4,653,848 A | * | 3/1987 | Kloots | 385/100 |
| 5,037,175 A | | 8/1991 | Weber | 385/76 |
| 5,329,603 A | * | 7/1994 | Watanabe et al. | 385/86 |
| 5,347,603 A | | 9/1994 | Belenkiy et al. | 385/86 |
| 5,640,476 A | | 6/1997 | Womack et al. | 385/86 |
| 5,710,851 A | | 1/1998 | Walter et al. | 385/86 |
| 5,764,839 A | | 6/1998 | Igl et al. | 385/114 |
| 5,781,681 A | | 7/1998 | Manning | 385/86 |
| 5,889,910 A | | 3/1999 | Igl et al. | 385/100 |
| 5,892,871 A | * | 4/1999 | Dahan et al. | 385/100 |
| 5,933,557 A | | 8/1999 | Ott | 385/86 |
| 6,039,081 A | | 3/2000 | Albert | 138/120 |
| 6,134,370 A | | 10/2000 | Childers et al. | 385/135 |

* cited by examiner

Primary Examiner—Brian Healy
Assistant Examiner—Daniel Valencia
(74) Attorney, Agent, or Firm—Karl D. Kovach

(57) ABSTRACT

An adjustable strain relief boot includes a stationary portion and a moving portion slidably connected to the stationary portion. The adjustable strain relief boot is used to guide an optical fiber away from a connector of the optical fiber. In application, the stationary portion of the adjustable strain relief boot is press fitted onto to the connector. The adjustable strain relief boot provides for a predetermined, fixed angle of departure of the optical fiber away from the connector. The fixed angle of departure can be adjusted by the operator from a first position to a second position. The fixed angle of departure is adjustable between forty five and ninety degrees. In a locked position, the moving portion can not move relative to the stationary portion since actuator engagement teeth of an actuator arm of the stationary portion engage teeth of the moving portion. In an unlocked position, a force is applied to a release tab of the actuator arm of the stationary portion so as to disengage the actuator engagement teeth of the stationary from the teeth of the moving portion so as to allow the moving portion to move relative to the stationary portion. Due to the resiliency of the actuator arm of the stationary portion, when the force applied to the release tab is removed, the actuator arm tends to move towards its undeflected position thus engaging the actuator engagement teeth with the teeth of the moving portion.

14 Claims, 4 Drawing Sheets

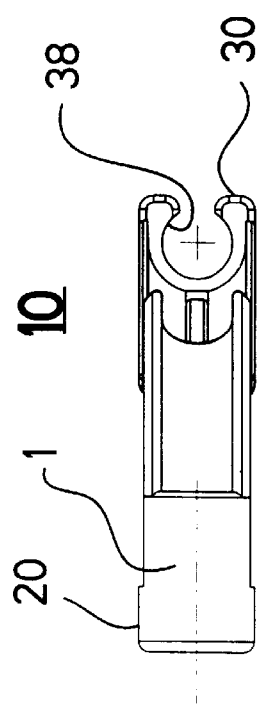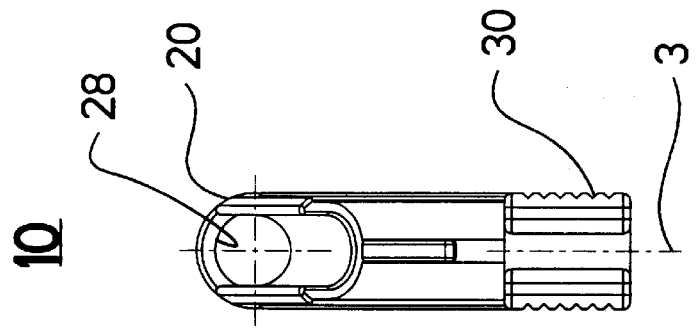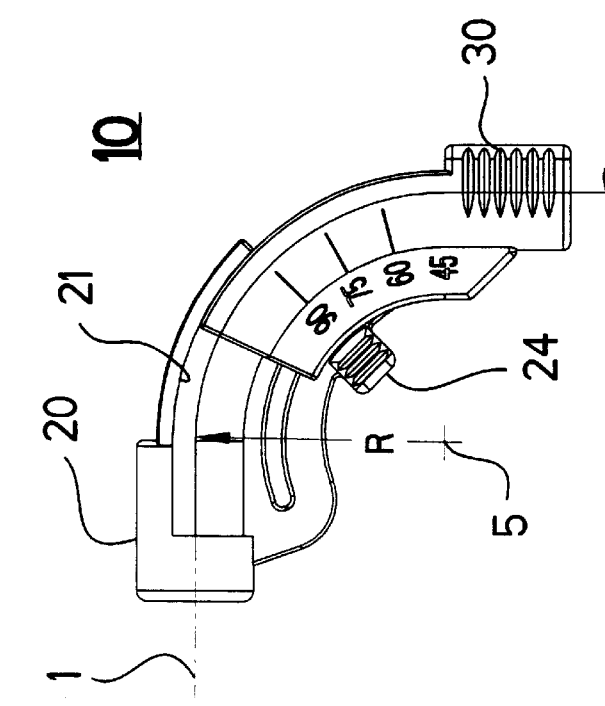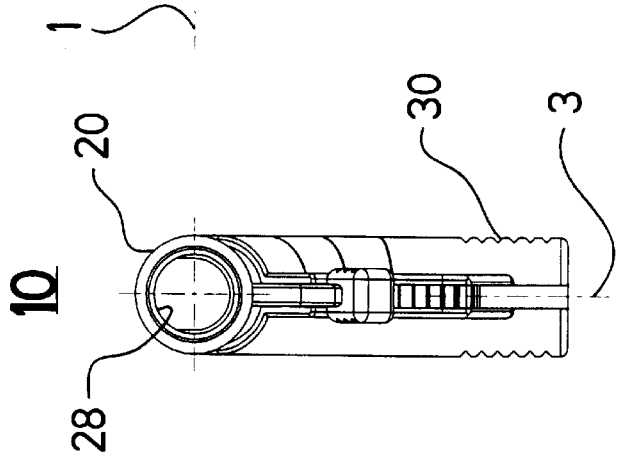

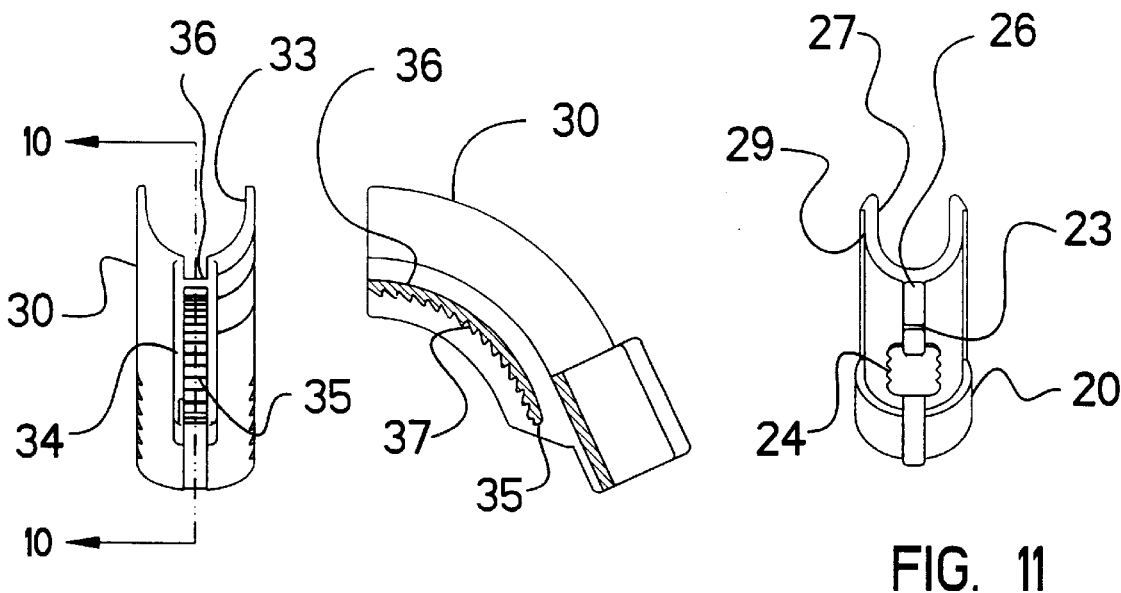
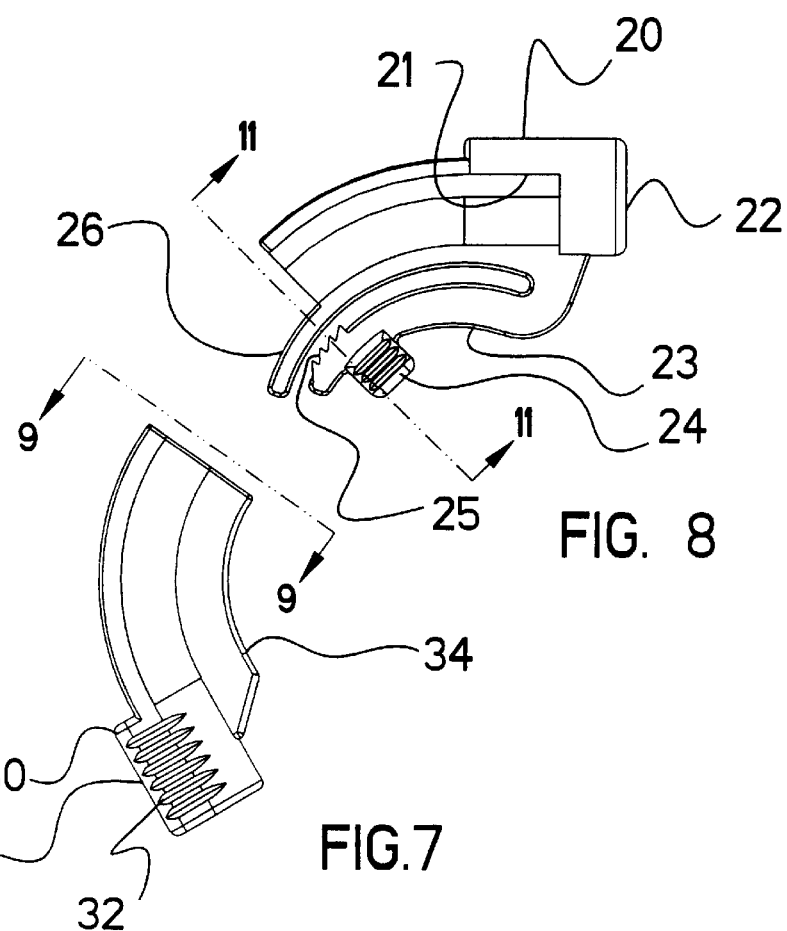

ADJUSTABLE STRAIN RELIEF BOOT

BACKGROUND OF THE INVENTION

1. Field of the Invention

The present invention relates to a strain relief boot for a connector. The invention more particularly concerns a strain relief boot which is adjustable and where the adjustable strain relief boot is used in combination with an optical connector having an optical fiber.

2. Discussion of the Background

The application of fiber optics to the telecommunication and data storage industries is expanding ever day. Fiber optics enables the high-speed transmission of communications and data. Connectors for optical fibers can be found in the back of instrumentation, telecommunication, routing, and switching cabinets. These cabinets accept a large number of fiber optic connectors. The optical fibers project away from the connector and tend to bend toward the ground due to the effect of gravity or the optical fibers are bent in a different direction due to an externally applied force. An optical signal passing through an optical fiber can experience a power loss if the bend radius of the optical fiber is too great. In order to prevent the optical fiber from being bent beyond a minimum bend radius, strain relief boots can be attached to the optical fiber in a region adjacent to the connector. The strain relief boot provides for a gentle, smooth, non-abrupt transition of the optical fiber from the connector to some other environment so as to maintain the optical signal at an acceptable power level.

Typically, strain relief boots have a straight, unbent shape when they are not subject to an externally applied force. Such a strain relief boot is disclosed in U.S. Pat. No. 5,781,681 which is hereby incorporated herein by reference. Other strain relief boots having variable shapes are also known and are disclosed in U.S. Pat. Nos. 5,933,557; 5,764,839; 6,039,081; and 5,889,910 all of which are hereby incorporated herein by reference. Yet other strain relief boots have a nominal shape of ninety degrees between the connector and the rest of the optical fiber. Such geometry is disclosed in U.S. Pat. Nos. 5,347,603; 5,640,476; 5,710,851; 6,134,370; and 5,037,175 all of which are hereby incorporated herein by reference. FIG. 12 is taken from U.S. Pat. No. 5,781,681 showing a prior art connector 40. The prior art connector 40 includes the prior art optical fiber 47 which is surrounded, adjacent to the connector, by the prior art strain relief boot 45. FIG. 13 is a cross sectional view of the prior art connector 40 of FIG. 12 showing how the prior art strain relief boot 45 bends when the prior art optical fiber 47 is subjected to a side load.

Due to the shear number of optical fibers populating the above-mentioned cabinets, the optical fibers and their associated strain relief boots bend at the same angle thus resulting in the optical fibers contacting each other and entangling with each other.

Thus, there is a need to provide for the projection of an optical fiber away from its connector at an angle which is different than the projection of another optical fiber away from its associated connector so as to avoid entanglement and congestion of the massive number of optical fibers.

SUMMARY OF THE INVENTION

It is an object of the invention to provide a strain relief boot which maintains a predetermined, fixed angle but is also adjustable so as to maintain at least another, predetermined, fixed angle.

It is a further object of the invention to provide a strain relief boot that prevents the minimum bend radius of the optical fiber from being exceeded.

It is another object of the invention to provide a strain relief boot that prevents adjacent optical fibers from becoming entangled.

In one form of the invention the adjustable strain relief boot includes a stationary portion and a moving portion slidably connected to the stationary portion. The stationary portion is adapted to be attached to the connector of the optical fiber. The moving portion is associated with the optical fiber so as to guide the optical fiber. The moving portion is adjustable between at least two fixed, predetermined positions relative to the stationary portion.

Thus, the invention achieves the objectives set forth above. The invention provides a strain relief boot which projects the optical fiber away from its connector at a fixed, predetermined angle and where the strain relief boot can be adjusted to another fixed, predetermined angle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a side view of the adjustable strain relief boot of FIG. 2 showing the stationary portion and the moving portion;

FIG. 4 is a front view of the adjustable strain relief boot of FIG. 3;

FIG. 5 is a back view of the adjustable strain relief boot of FIG. 3;

FIG. 6 is a top view of the adjustable strain relief boot of FIG. 3;

FIG. 7 is a side view of the moving portion of the adjustable strain relief boot;

FIG. 8 is a side view of the stationary portion of the adjustable strain relief boot;

FIG. 9 is a view taken along line 9—9 of FIG. 7 of the moving portion;

FIG. 10 is a cross-sectional, side view of the moving portion of FIG. 9 taken along section line 10—10;

FIG. 11 is an end view taken along line 11—11 of FIG. 8 of the stationary portion;

DETAILED DESCRIPTION OF THE PRESENTLY PREFERRED EMBODIMENT

Figure 1:
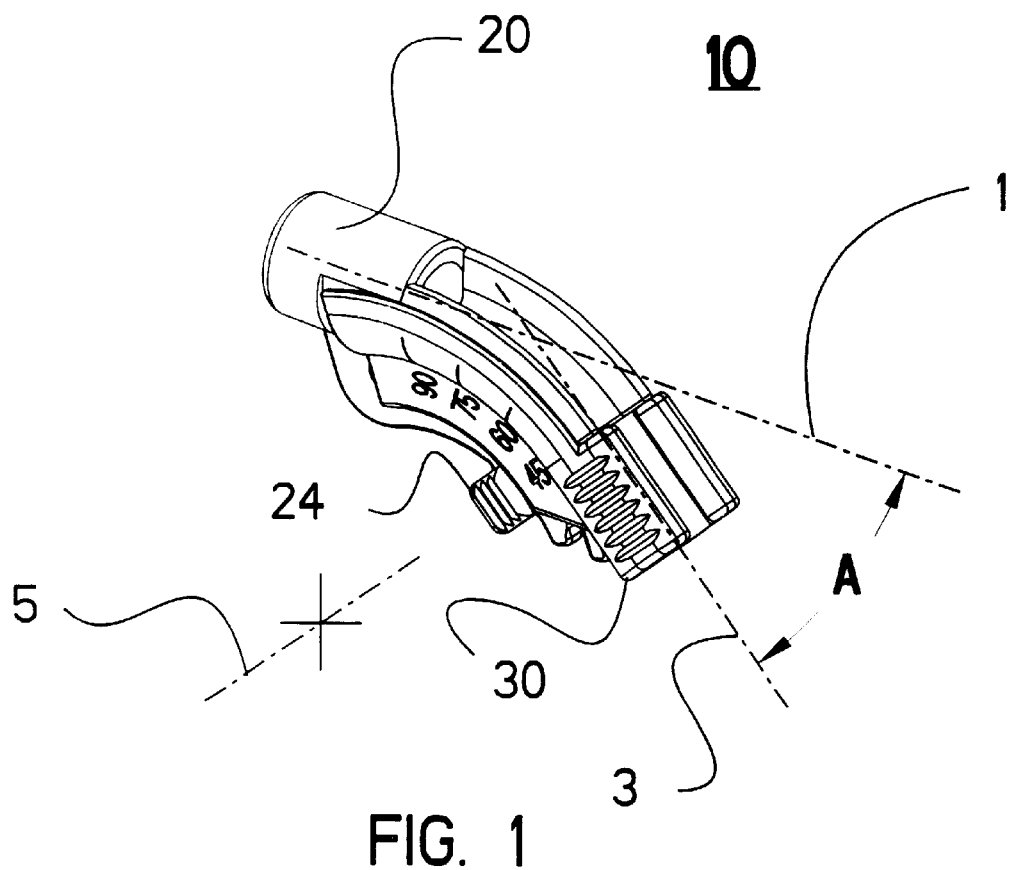
FIG. 1 is a perspective view of the adjustable strain relief boot of the invention adjusted to a forty-five degree position.

Referring now to the drawings, wherein like reference numerals designate identical or corresponding parts throughout the several views, and more particularly to FIGS. 1–11 thereof, an embodiment of the present invention is an adjustable strain relief boot 10.

FIG. 1 is a perspective view of the adjustable strain relief boot 10 adjusted to a fortyfive degree position. FIG. 1 shows the stationary portion 20 and the moving portion 30. The moving portion 30 is capable of pivoting about a pivot axis 5. When the adjustable strain relief boot 10 is adjusted to the forty-five degree position, the stationary portion fiber optic holder axis 1 is located forty-five degrees away from the moving portion fiber optic holder axis 3 and is identified by letter designator A. Furthermore, a release tab 24 of the stationary portion 20 is also shown as being aligned with a forty-five degree numerical indicator molded into the side of the moving portion 30. The length of a line normal to both the pivot axis 5 and to the stationary portion fiber optic holder axis 1 is greater than the minimum bend radius of the optical fiber being bent, and the length of a line normal to both the pivot axis 5 and to the moving portion fiber optic holder axis 3 is greater than the minimum bend radius of the optic fiber being bent.

Figure 2:
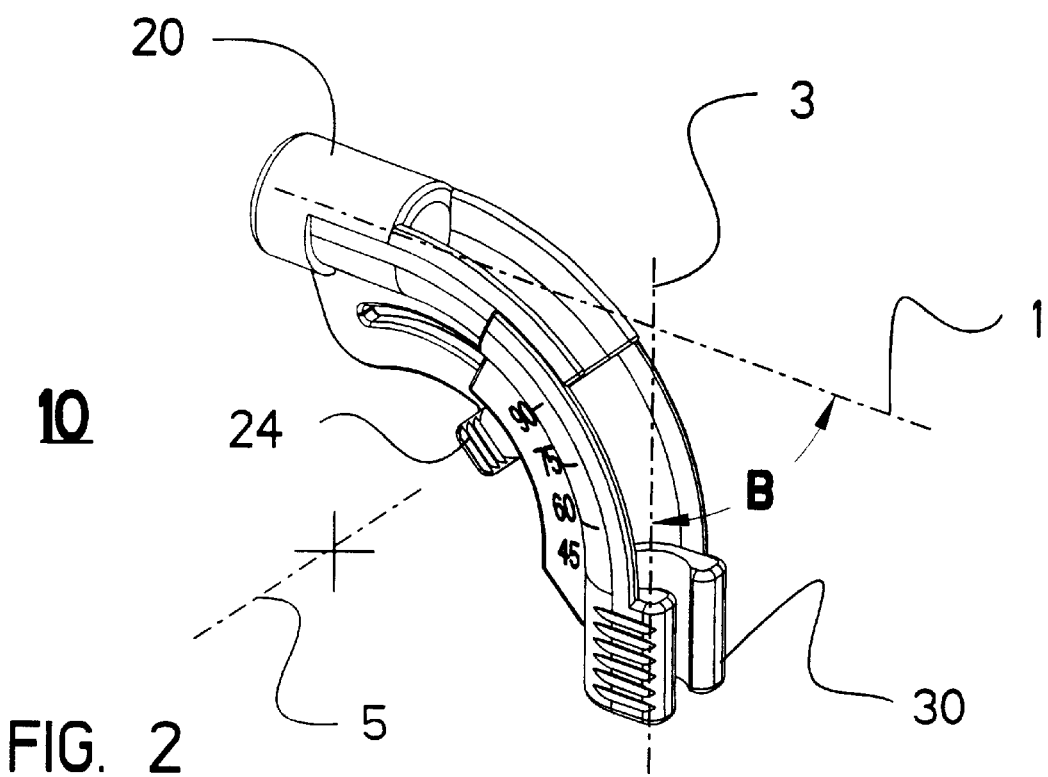
FIG. 2 is a perspective view of the adjustable strain relief boot adjusted to a ninety degree position.
Figure 12:
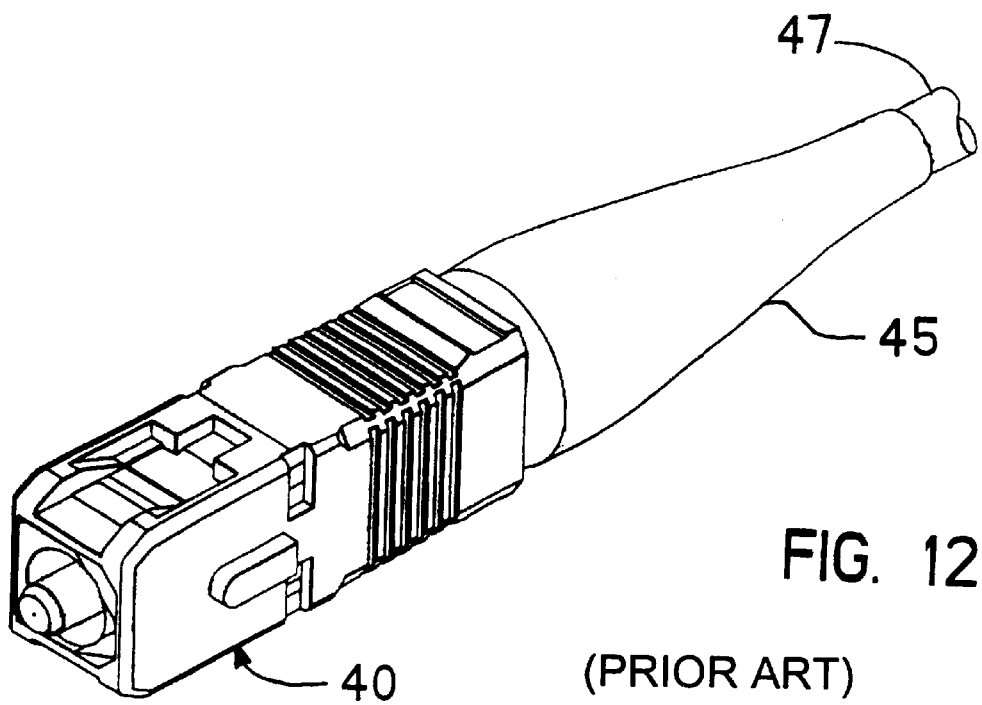
FIG. 12 is a perspective view of the prior art connector and boot.
Figure 13:
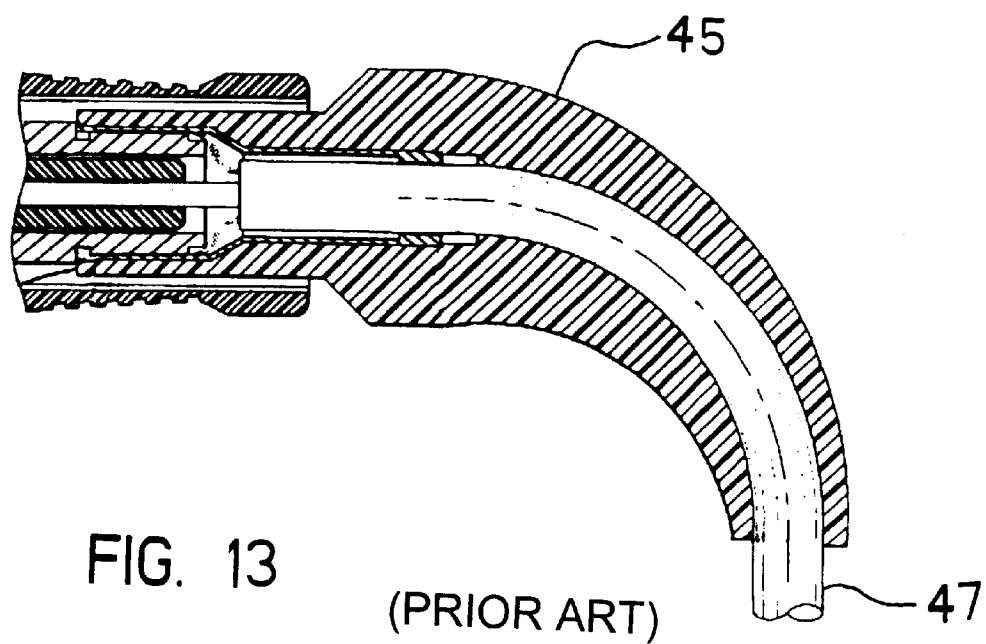
FIG. 13 is a cross-sectional, side view of the prior art connector of boot of FIG. 12.

FIG. 2 is a perspective view of the adjustable strain relief boot 10 where the adjustable strain relief boot 10 is adjusted to the ninety degree position. The angle formed between the stationary portion fiber optic holder axis 1 and moving portion fiber optic holder axis 3 is ninety degrees and is identified the letter designator B. The release tab 24 of the stationary portion 20 is shown as being aligned with a ninety degree numerical indicator molded into the side of the moving portion 30.

FIG. 3 is a side view of the strain relief boot 10 of FIG. 2 adjusted to the ninety degree position. Also shown is the bend radius R. Bend radius R is greater than or equal to the minimum bend radius of the optical fiber. Support ledge 21 is formed from a recessed portion of the stationary portion 20 which provides support for the moving portion 30.

FIG. 4 is a front view of the adjustable strain relief boot 10 of FIG. 3 further showing a stationary portion fiber optic holder 28. The stationary portion fiber optic holder 28 connects to or is most adjacent to the terminal and/or connector end of the fiber optic cable and during use it typically does not move with respect to the connector.

FIG. 5 is a back view of the adjustable strain relief boot 10 of FIG. 3 further showing the stationary portion fiber optic holder 28.

FIG. 6 is a top view of the adjustable strain relief boot 10 further showing a moving portion fiber optic holder 38 of the moving portion 30 which prevents the optical fiber from becoming detached from the moving portion 30, however, the moving portion fiber optic holder 38 provides for relative motion between the optical fiber and the moving portion 30.

FIG. 7 is side view of the moving portion 30. FIG. 7 further shows a ribbed surface texture 32 at a sliding end 31 of the moving portion 30 along with a track portion 34.

FIG. 9 is a front view of the moving portion 30 taken along line 9—9 of FIG. 7. FIG. 9 further shows details of the track portion 34 which includes a web 35. The track portion 34 also includes material attached to and oriented perpendicular to the web 35. The web 35 also includes a sliding surface 36. Also shown is a retaining surface 33 which helps to guide the stationary portion 20 and to maintain a uniform bend radius on the optical fiber.

FIG. 10 is a cross-sectional, side view of the moving portion 30 taken along section line 10—10 of FIG. 9. FIG. 10 further shows details of the web 35 including the sliding surface 36, and teeth 37.

FIG. 8 is a side view of the stationary portion 20. FIG. 8 shows an actuator arm 23 to which the release tab 24 is attached. The actuator arm 23 further includes actuator engagement teeth 25. FIG. 8 also shows a connector end 22 and the support ledge 21 running substantially along a length of the stationary portion 20. A stationary guide 26 is positioned substantially parallel to the actuator arm 23. The stationary guide 26 contacts the sliding surface 36 of the web 35 of the moving portion 30 and is also contained by the material of the track portion 34 oriented substantially perpendicular to the web 35. The actuator arm 23 is resilient as compared to the stationary guide 26. When the adjustable strain relief boot 10 is installed on an optical fiber the connector end 22 is situated on or adjacent to the connector of the optical fiber.

The connector end 22 of the stationary portion 20 connects to the connector of optical fiber by way of a press fit. It is noted that the stationary portion 20 of the adjustable strain relief boot 10 can be slid onto the connector at any angle around the axis of the connector three-hundred-sixty degrees around so as to provide for optimum projection of the optical fiber away from the connector.

FIG. 11 is an end view of the stationary portion 20 taken along line 11—11 of FIG. 8. FIG. 11 further shows the stationary guide 26, a retaining surface 27, the actuator arm 23, and the release tab 24. The retaining surface 27 helps to maintain the smooth bend radius of the optical fiber and helps to retain the optical fiber within the stationary portion 20. An outer surface 29 of the stationary portion 20 contacts and slides against the retaining surface 33 of the moving portion 30.

In use, the user pulls the release tab 24 away from the stationary guide 26 so as to disengage the actuator engagement teeth 25 from engagement with the complementary shaped teeth 37 of the web 35 of the moving portion 30. At that time, the user can then slide the moving portion 30 relative to the stationary portion 20 and also relative to the optical fiber (not shown). When the user adjusts the adjustable strain relief boot 10 to the appropriate position, the user releases the release tab 24 and the resilient actuator arm 23 moves toward its undeflected position and as such the actuator engagement teeth 25 engage the teeth 37 of the web 35 of the moving portion 30 so as to lock in place the selected position and as such, the adjustable strain relief boot 10 has a fixed position.

The teeth 25, 37 are sized so that when the moving portion 30 is adjusted relative to the stationary portion 20 by the distance of one tooth, then the moving portion 30 has moved by approximately five degrees. Thus, in FIG. 3, the adjustable strain relief boot 10 has fixed stops at forty-five, fifty, fifty-five, sixty, sixty-five, seventy, seventy-five, eighty, eighty-five, and ninety degrees. However, different shapes teeth can be used other than shown which will provide for either a finer or more coarse adjustment.

When the adjustable strain relief boot 10 is used in a cabinet one set of adjustable strain relief boots 10 can be adjusted to a first fixed angle, and a second set of adjustable strain relief boots 10 can be adjusted to a second fixed angle, and so on many times over so that the optical fibers projecting out of the cabinet do not result in entanglement or congestion.

Preferably, the stationary portion 20 and the moving portion 30 are made out of a polymer. However, the stationary portion 20 and moving portion 30 may be made of any suitable engineering material.

The adjustable strain relief boot 10 can be used with a connector and an optical cable where multiple optical fibers pass through and are guided by the adjustable strain relief boot 10.

It is further envisioned that the adjustable strain relief boot can be adjusted through angles greater than a forty-five degrees. In one example, the adjustable strain relief boot is adjusted through ninety degrees. In such an example, some of the locking hardware is moved from the sliding area to an area along the pivot axis 5 so as to eliminate interference problems. In other embodiments, the adjustable strain relief boot is adjustable through any angle.

Obviously, numerous modifications and variations of the present invention are possible in light of the above teachings. It is therefore to be understood that within the scope of appended claims, the invention may be practiced otherwise than as specifically described herein.

What is claimed is:

1. An adjustable strain relief boot for guiding an optical fiber in a region adjacent to a connector of the optical fiber, the adjustable strain relief boot comprising:
    a stationary portion attachable to the connector of the optical fiber; and
    a moving portion slidably connected to the stationary portion, the moving portion being adjustable between a first position and a second position, and wherein the first position is different from the second position, and the moving portion being associated with the optical fiber so as to guide the optical fiber.

2. The adjustable strain relief boot according to claim 1 wherein the stationary portion includes a stationary portion fiber optic holder for connecting to the connector of the optical fiber.

3. The adjustable strain relief boot according to claim 2 wherein the stationary portion includes an actuator arm and a stationary guide, and wherein the actuator arm includes a release tab, and wherein the actuator arm includes actuator engagement teeth, and wherein the actuator arm is resilient relative to the stationary guide.

4. The adjustable strain relief boot according to claim 3 wherein the moving portion includes a track portion, and wherein the track portion includes a web.

5. The adjustable strain relief boot according to claim 4 wherein the web of the moving portion includes a sliding surface and teeth, and wherein the teeth of the web of the moving portion are complimentary to the actuator engagement teeth of the stationary portion, and wherein the sliding surface of the web of the moving portion is complimentary to the stationary guide of the stationary portion.

6. The adjustable strain relief boot according to claim 5 wherein the moving portion includes a moving portion fiber optic holder for supporting and guiding the optical fiber.

7. The adjustable strain relief boot according to claim 6 wherein the moving portion fiber optic holder includes a moving portion fiber optic holder axis, and wherein the stationary portion fiber optic holder includes a stationary portion fiber optic holder axis, and wherein, in the first position, the moving portion fiber optic holder axis is separated from the stationary portion fiber optic holder axis by a first angle, and wherein the first angle is substantially equal to forty-five degrees, and wherein, in the second position, the moving portion fiber optic holder axis is separated from the stationary portion fiber optic holder axis by a second angle, and wherein the second angle is substantially equal to ninety degrees.

8. The adjustable strain relief boot according to claim 7 wherein the stationary portion is made of a polymer material.

9. The adjustable strain relief boot according to claim 8 wherein the moving portion is made of a polymer material.

10. The adjustable strain relief boot according to claim 9 wherein, in a locked position, the actuator engagement teeth of the actuator arm of the stationary portion engage the teeth of the web of the moving portion so as to prevent the moving portion from moving relative to the stationary portion, and, in an unlocked position, a force is applied to the release tab of the actuator arm so as to disengage the actuator engagement teeth of the actuator arm from the teeth of the web of the moving portion so as to allow the moving portion to move relative to the stationary portion.

11. The adjustable strain relief boot according to claim 10 wherein the moving portion includes a first ribbed surface pattern.

12. The adjustable strain relief boot according to claim 11 wherein the release tab of the actuator arm of the stationary portion includes a second ribbed surface pattern.

13. The adjustable strain relief boot according to claim 4 wherein a section of the web of the moving portion being situated between the actuator arm and the stationary guide of the stationary portion.

14. The adjustable strain relief boot according to claim 13 wherein a section of the track portion of the moving portion bounds a section of the actuator arm and a section of the stationary guide of the stationary portion.

* * * * *